2,976,333
PRODUCTION OF AROMATIC COMPOUNDS

James Kenneth Dixon, Riverside, Edwin Marvin Smolin, Stamford, and Kenneth Worden Saunders, Darien, Conn., assignors to American Cyanamid Company, New York, N.Y., a corporation of Maine No Drawing. Filed June 23, 1954, Ser. No. 438,875

10 Claims. (Cl. 260—669)

This invention relates to the production of aryl compounds having at least one aliphatic nuclear substituent which contains a carbon-to-carbon double bond and, more particularly, to the production of such aryl compounds as those which have a vinyl group attached to an aryl nucleus.

Methods of producing styrenes and other aryl compounds made in accordance with the present invention have been previously disclosed as, for example, in the Sturrock and Lawe U.S. Patent No. 2,373,982 which issued April 17, 1945. This patent deals with the use of silicious catalyst and, more particularly, hydrated aluminum silicate catalyst. Modified alumina-silica catalysts have also been disclosed as, for example, in the Dixon U.S. Patent Nos. 2,422,163–5 wherein such modifiers as titania, zirconia and thoria have been employed.

An object of the present invention is to provide improved catalysts which are effective for the conversion of diaryl substituted paraffin, having at least two carbon atoms in the paraffin chain and having the aryl groups attached to the same carbon atom, into two aromatic compounds including one which has an aliphatic nuclear substituent containing a carbon-to-carbon double bond.

This and other objects of our invention are attained by employing a boria-alumina catalyst. Thus, the present process contemplates contacting a vapor comprising a compound of the class consisting of paraffins having at least two carbon atoms and having two aryl substituents attached to one of said carbon atoms and their nuclear substituted derivatives with a boria-alumina catalyst at a temperature of at least 350° C. and preferably at a temperature of 500–600° C. It is preferable that the contact time of the vaporous paraffin with the catalyst be less than 0.8 second and in order to avoid practical difficulties it is generally desirable to employ a contact time of 0.001 second or more. Still another feature of the present process is the use of a diluent, preferably water vapor in relatively high proportions, namely, from about 5 to about 150 or more mols of diluent per mol of the diaryl substituted paraffin. Water vapor is one of the most desirable diluents since it may be easily condensed and thereby separated from the final product.

The following example in which the proportions are in parts by weight is given by way of illustration and not limitation. The diaryl substituted paraffin employed in the example is 1,1-ditolylethane.

Example 32.5 parts of a boria-alumina catalyst were packed into a stainless steel converter and heated at a temperature maintained at about 525° C. The boria-alumina catalyst was prepared by drying overnight in an oven maintained at about 215° F. 3800 parts of a 13% alumina gel solution to which were added 25 parts of boric acid in 500 parts of water. Over the heated catalyst in a period of two hours, 172 parts of 1,1-ditolylethane were fed at a uniform rate with a 88:1 molar dilution of steam. Conversion of the starting material at the end of the first hour was 46% and at the end of the second was 41%. Toluene and methylstyrene obtained by the decomposition of the 1,1-ditolylethane were removed by low-pressure distillation. The mixture titrated with potassium bromide-bromate solution indicated unsaturation calculated as methylstyrene of 52.8%.

Catalyst suitable for use in accordance with our invention may be prepared by combining boric oxide with the alumina in any one of a number of ways. For instance, where the alumina is in the form of fragments, pellets or powder having a large internal surface, the boric oxide may be conveniently incorporated by impregnation. This may be accomplished by soaking the particles, pellets or powder in a solution of boric oxide or a compound of boron which may be easily converted to boric oxide as by heating. Suitable boron compounds that may be employed are such as boric acid, ammonium borate, various organic compounds of boron such as the boric acid esters, alkyl boranes and the like. The impregnated boron compound is converted to boric oxide by drying and then calcining at temperatures above about 300° C. The catalyst may also be prepared where the alumina is in the form of a gel, peptized gel or the like, by homogenization with boric acid or other suitable compounds of boron which may be easily converted to the boric oxide and the homogenized mixture then calcined to simultaneously effect dehydration of the gel and to convert the boron compound to boric oxide. The proportion of boria to alumina by weight may vary from as little as 1 part to 99 parts, respectively, up to as high as 99 parts to 1 part, respectively. It is preferred, however, that the proportion of boria to alumina by weight be within the order of from about 5:95 to about 20:80 parts per part, respectively.

Our catalysts may include other heat resistant and solid substances which activate them and/or which are entirely inert. Such substances may be used to extend the active surface of the boria-alumina catalysts, or they may be used as supports for the catalysts. For example, the catalysts employed in accordance with this invention may be supported upon finely-divided silicon carbide, non-porous aluminum oxide and highly fired ceramic materials in the form of rings, saddles, grids and the like. Binding agents such as sodium silicate may be advantageously employed in some cases to improve the mechanical stability of our catalysts.

Our catalysts are employed in a finely-divided condition fashioned into pellets which are preferably no larger than about 15 millimeters in their greatest diameter. The pellets may be in any desired shape such as cylinders, spheres, rings, or of an irregular granular shape. When large pellets are employed, the vapor velocity varies widely between the center and outside of the pellet and, therefore, the contact time at the center of the pellet is longer than desirable. It is preferable that the particles be as fine as possible in order to reduce the difference between the maximum and minimum vapor velocities which occur in the catalyst bed. Obviously, the particle size should not be so small that there is an excessive pressure drop through the catalyst bed, or so large relative to the diameter of the catalyst chamber as to cause channeling through the bed.

The converter into which the catalyst is packed may be a tube constructed of steel, silica or any other suitable material and in large scale operations the converter may comprise a plurality of such tubes or it may be a shell-type converter having one or more layers or trays of catalyst therein.

A short contact time of the diaryl paraffin with the catalyst is desirable in carrying out the reactions in accordance with this invention. While longer contact times may be used if desired, it is generally preferable that the contact time be less than 0.8 second. The contact times between about 0.1 and 0.05 are especially suitable. Generally, it is desirable to employ a contact time of 0.001 second or longer in order to avoid practical difficulties. The calculation of the contact of the vapor with the catalyst is a complex matter and, in order to simplify this calculation, we have used the term "contact time" herein to mean those values which are computed on the assumption that the catalyst contains 50% voids and neglecting both the pressure drop through the catalyst and the increase in volume which occurs during the reaction. The contact time employed in the foregoing example is about 0.1 second.

Inasmuch as the reaction is neither highly exothermic nor endothermic, it is not necessary to supply much more heat than that necessary to compensate for conduction and radiation losses in order to maintain the reaction temperature of the vapors passing through the catalyst, providing the vapors which are fed to the catalyst are preheated to about the desired reaction temperature and providing a high ratio of diluent to the diaryl paraffin is employed. We therefore prefer that the vapors fed to the catalyst be preheated to the reaction temperature. Any suitable method of heating the converter may be employed as, for example, electrical resistance heaters.

The following are illustrative of the aliphatic compounds having two aryl substituents attached to the same carbon atom thereof which may be converted into the mononuclear aromatic compounds in accordance with the present invention: 1,1-diphenylethane; each of the 1-phenyl-1-tolylethanes; each of the 1,1-ditolylethanes; each of the 1-phenyl-1-xylylethanes; each of the 1-tolyl-1-xylylethanes; each of the 1,1-dixylylethanes; 1,1-diphenylpropane; each of the 1-phenyl-1-tolylpropanes; each of the 1,1-ditolylpropanes; each of the 1-tolyl-1-xylylpropanes; each of the 2,2-ditolylpropanes; each of the 1,1-di(monochlorophenyl)-ethanes; each of the 1,1-di(dichlorophenyl)-ethanes; each of the 1,1-di(monohydroxyphenyl)-ethanes; each of 1,1-dicresylethanes; each of the 2,2-dicresylpropanes; each of the 1,1-dinaphthylethanes; each of the 2,2-dinaphthylpropanes; each of the 1,1-dixenylethanes; each of the 1-tolyl-1-naphthylethanes; and the like and their nuclear substituted halogen, hydroxyl and other derivatives all of which are volatile at the temperature and pressure used in the process. These substances containing tolyl, xylyl, cresyl, xenyl, monochlorophenyl and dichlorophenyl groups may be attached to the carbon atom of the paraffin chain at the ortho, meta, or para positions and when two of these groups are present they may be attached in the same or different positions.

The reaction temperature may be varied from about 350° C. up to about 600° C., or even higher in some cases. Temperatures above 600° C. cause some pyrolysis loss but on the other hand some of the diaryl paraffins are not easily decomposed at lower temperatures. It is particularly important to employ a short time of contact when temperatures in the neighborhood of 600° C. are used in order to avoid an undesired amount of pyrolysis loss due to side-reactions. Among such side-reactions are those which lead to the formation of polynuclear compounds including anthracene derivatives.

One of the advantages of employing a short contact time with catalysts is that the life thereof is prolonged. With contact times of the order of one second or more the catalysts may become fouled in a relatively short period of time due to the deposition of carbonaceous materials on the surface of the catalyst. When it is necessary or desirable to reactivate the catalyst, this may be done by passing heated air, preferably mixed with steam or carbon dioxide, through the catalyst. The temperature of the air and steam mixture should be raised to about 500°–650° C. The air enables the carbon to burn whereas the steam or carbon dioxide which is used in conjunction with the air keeps the temperature from rising too high which might cause a reduction in the activity in the catalyst. Generally, at temperatures of about 500° C. the carbon begins to burn off and the heat of this reaction causes the temperature to rise to about 650° C. without the application of any external heat.

It may be seen that the proximity of the reactivation temperature to the reaction temperature greatly simplifies the change from normal operation to reactivation and back to normal operation. Since the normal highly active life of the catalyst greatly exceeds the time required for its reactivation, the operation of two or more converters in parallel is readily accomplished. The short time of reactivation enables one to keep one or more converters in normal operation while one or more other converters are being reactivated.

Any material which is volatile and which does not react with the diaryl substituted paraffin which is to be used in accordance with our process and which does not react with the products formed by the decomposition of the diaryl substituted paraffin may be used as a diluent. Among these, some examples are: water, the hydrocarbons (such as benzene and toluene), the fixed gases (such as nitrogen and carbon dioxide), etc. Water vapor is the preferred diluent inasmuch as it may be readily condensed and therefore separated from the products of the reaction, whereas the fixed gases or the hydrocarbons are somewhat more difficult to separate from the product and such separation requires higher expenditures than are required for the separation of water from the product. Water vapor also has an additional advantage in that it may maintain the catalyst in highly active form.

One of the most important reasons for the use of a diluent is that the time of contact of the diaryl substituted paraffin with the catalyst can be reduced to the desired point easily. It has been found that in order to obtain the short contact times which are desirable in accordance with the present invention the molal ratio of diluent to the diaryl substituted aliphatic compound in the feed to the catalyst is preferably between about 5:1 and 150:1, or more. If the feed can be supplied rapidly enough to provide a low contact time without the use of the large proportion of diluent, the ratio of diluent to the diaryl substituted paraffin may be as low as 1:2.

It has been found that it is frequently desirable to convert only a few percent of the diaryl substituted paraffin fed to the catalyst in one pass but, by recovering the unconverted diaryl substituted paraffin and recirculating it from one to five times or more, a high yield is obtained very economically.

Our process may be operated at elevated or reduced pressure and under some conditions it may be particularly advantageous to operate under reduced pressure. If the diaryl substituted paraffin which is to be used in accordance with present processes is not readily volatile at ordinary pressure, reduced pressures may be used to facilitate the operation of our process.

The present process is a convenient and economical method of converting the diaryl substituted paraffins, having at least two carbon atoms in the paraffin chain and having the two aryl groups attached to the same carbon atom, into two aromatic compounds, one of which contains a side chain having an ethylenic group. The vinyl substituted aryl compounds prepared in accordance with the present invention have wide utility in the production of polymers which in turn are useful for molding, casting, laminating and for many other purposes. Furthermore, pure aryl compounds such as xylene isomers in extremely high purity may be produced simultaneously with the production of the aromatic compound containing an ethylenic side chain. Thus, when a diaryl substituted paraffin is cracked in accordance with this invention, one molecule of an aryl compound having an ethylenic side chain is obtained together with one molecule of an aryl compound which does not have an ethylenic side chain. Such aryl compounds as, for example m-xylene or p-xylene, find utility in the synthesis of organic compounds where the presence of one or more of the possible isomers is undesired. This may be shown in the production of a diaryl substituted paraffin by the reaction of a mixture of o-, m- and p-xylenes and ethyl benzene with paraldehyde, acetaldehyde or acetylene. Here the meta isomer reacts preferentially, thus enriching the unreacted mixture in the ortho and para isomers of xylene and also in ethyl benzene. P-xylene may be recovered from this mixture by fractional crystallization methods apparent to those skilled in the art. Upon decomposition of the diaryl substituted paraffin of this synthesis, the aryl compound obtained will contain a predominent amount of m-xylene.

We claim:

1. A process of producing a plurality of aromatic compounds which comprises mixing an asymmetric diarylethane with a diluent, contacting the resulting mixture thereof with a boron oxide-alumina catalyst and maintaining the temperature of said mixture at a temperature which will cause said asymmetric diarylethane to decompose into a plurality of aromatic compounds in the presence of a catalyst and which is at least 350° C. during the contact time with said catalyst of between about 0.001 second and about 0.8 second.

2. A process of producing a plurality of aromatic compounds which comprises mixing an asymmetric diarylethane with water vapor diluent, contacting the resulting mixture thereof with a boron oxide-alumina catalyst and maintaining the temperature of said mixture at a temperature which will cause said asymmetric diarylethane to decompose into a plurality of aromatic compounds in the presence of a catalyst and which is at least 350° C. during the time it is in contact with said catalyst.

3. In a method of producing a plurality of aromatic compounds, the step which comprises contacting an asymmetric ditolylethane with a boron oxide-alumina catalyst at a temperature which will cause said ditolylethane to decompose into a plurality of aromatic compounds in the presence of a catalyst and which is at least 350° C. and for a contact time of less than 0.8 second.

4. In a method of producing a plurality of aromatic compounds, the step which comprises contacting 1,1-dixylylethane with a boron oxide-alumina catalyst at a temperature which will cause said dixylylethane to decompose into a plurality of aromatic compounds in the presence of a catalyst and which is at least 350° C. and for a contact time of less than 0.8 second.

5. In a process for producing a plurality of aromatic compounds, the step which comprises contacting an asymmetric diarylethane with a boron oxide-alumina catalyst at a temperature which will cause said diarylethane to decompose into a plurality of aromatic compounds in the presence of a catalyst and which is at least 350° C. and for a contact time of less than 0.8 second, said diarylethane having at least one aryl group substituted with an alkyl group.

6. In a process for producing a plurality of aromatic compounds, the step which comprises contacting an asymmetric diarylethane with a boron oxide-alumina catalyst at a temperature which will cause said diarylethane to decompose into a plurality of aromatic compounds in the presence of a catalyst and which is at least 350° C. and for a contact time of less than 0.8 second, said diarylethane having at least one aryl group substituted with a hydroxyl group.

7. In a process for producing a plurality of aromatic compounds, the step which comprises contacting an asymmetric diarylethane with a boron oxide-alumina catalyst at a temperature which will cause said diarylethane to decompose into a plurality of aromatic compounds in the presence of a catalyst and which is at least 350° C. and for a contact time of less than 0.8 second, said diarylethane having at least one aryl group substituted with an alkyl group and a hydroxyl group.

8. A process for producing vinyl substituted aryl compounds which comprises heating an asymmetric diarylethane at a temperature which is at least 350° C. and which will cause said diarylethane to decompose in the presence of a boron oxide-aluminum catalyst.

9. A process for producing dimethylstyrene which comprises heating 1,1-dixylylethane at a temperature which is at least 350° C. and which will cause said dixylylethane to decompose in the presence of a boron oxide-alumina catalyst.

10. A process for producing methylstyrene which comprises heating 1,1-ditolylethane at a temperature which is at least 350° C. and which will cause said ditolylethane to decompose in the presence of a boron oxide-alumina catalyst.

References Cited in the file of this patent

UNITED STATES PATENTS

| | | |
|---|---|---|
| 2,356,978 | Danforth | Aug. 29, 1944 |
| 2,373,982 | Sturrock et al. | Apr. 17, 1945 |
| 2,420,688 | Sturrock et al. | May 20, 1947 |
| 2,422,318 | Sturrock et al. | June 17, 1947 |
| 2,422,165 | Dixon | June 10, 1947 |
| 2,422,171 | Saunders | June 10, 1947 |
| 2,425,087 | Danforth | Aug. 5, 1947 |
| 2,653,979 | Kropa | Sept. 29, 1953 |

UNITED STATES PATENT OFFICE
CERTIFICATE OF CORRECTION

Patent No. 2,976,333  March 21, 1961

James Kenneth Dixon et al.

It is hereby certified that error appears in the above numbered patent requiring correction and that the said Letters Patent should read as corrected below.

Column 3, line 17, for "couduction" read -- conduction --; column 6, line 30, for "oxide-aluminum" read -- oxide-alumina --.

Signed and sealed this 3rd day of October 1961.

(SEAL)
Attest:

ERNEST W. SWIDER
Attesting Officer

DAVID L. LADD
Commissioner of Patents

USCOMM-DC